United States Patent
Stein et al.

(10) Patent No.: US 11,787,443 B2
(45) Date of Patent: Oct. 17, 2023

(54) USE OF A LOAD DISTRIBUTION OF AN AUTOMATED UTILITY VEHICLE FOR TRAJECTORY PLANNING AND TRAJECTORY CONTROL ADAPTED IN A SITUATION-DEPENDENT FASHION

(71) Applicant: Robert Bosch GmbH, Stuttgart (DE)

(72) Inventors: Fridtjof Stein, Ostfildern (DE); Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 16/874,024

(22) Filed: May 14, 2020

(65) Prior Publication Data

US 2020/0361492 A1  Nov. 19, 2020

(30) Foreign Application Priority Data

May 17, 2019 (DE) .................... 10 2019 207 276.3

(51) Int. Cl.
| | |
|---|---|
| *B60W 60/00* | (2020.01) |
| *B60W 40/13* | (2012.01) |
| *B60G 17/017* | (2006.01) |
| *G01C 21/36* | (2006.01) |
| *G01C 21/34* | (2006.01) |

(52) U.S. Cl.
CPC ....... *B60W 60/0025* (2020.02); *B60G 17/017* (2013.01); *B60W 40/13* (2013.01); *G01C 21/3407* (2013.01); *G01C 21/3691* (2013.01); *B60G 2300/02* (2013.01); *B60G 2400/61* (2013.01); *B60W 2300/12* (2013.01)

(58) Field of Classification Search
None
See application file for complete search history.

(56) References Cited

U.S. PATENT DOCUMENTS

| | | | |
|---|---|---|---|
| 11,238,672 B2* | 2/2022 | Mallela | G08G 1/207 |
| 2014/0156524 A1 | 6/2014 | Ruud et al. | |
| 2017/0234722 A1* | 8/2017 | Mount | G01G 23/01 |
| | | | 702/101 |
| 2018/0251123 A1* | 9/2018 | Sigmar | H02K 11/33 |
| 2018/0265076 A1* | 9/2018 | Hall | B60W 10/06 |
| 2019/0025844 A1* | 1/2019 | Wu | G07B 15/06 |
| 2021/0150900 A1* | 5/2021 | Seki | G01C 21/3626 |

FOREIGN PATENT DOCUMENTS

| | | |
|---|---|---|
| DE | 10 2004 021 726 A1 | 11/2005 |
| DE | 10 2018 002 265 A1 | 9/2018 |

* cited by examiner

*Primary Examiner* — Lail A Kleinman
(74) *Attorney, Agent, or Firm* — Maginot, Moore & Beck LLP

(57) ABSTRACT

A method for operating an automated utility vehicle includes, after a change in the load state of the automated utility vehicle, determining a current weight and/or a current load distribution of the automated utility vehicle. The method further includes making available the determined current weight and/or the determined current load distribution in the form of current load information. The current load information is used for situation-dependent adaptation of planning and/or control of a trajectory of the automated utility vehicle.

12 Claims, 4 Drawing Sheets

USE OF A LOAD DISTRIBUTION OF AN AUTOMATED UTILITY VEHICLE FOR TRAJECTORY PLANNING AND TRAJECTORY CONTROL ADAPTED IN A SITUATION-DEPENDENT FASHION

This application claims priority under 35 U.S.C. § 119 to patent application no. DE 10 2019 207 276.3, filed on May 17, 2019 in Germany, the disclosure of which is incorporated herein by reference in its entirety.

The disclosure relates to a method for operating an automated utility vehicle, wherein the weight and/or load distribution of the automated utility vehicle are/is used for trajectory planning and trajectory control adapted in a situation-dependent fashion. The disclosure also relates to a control device, to a computer program and to a machine-readable storage medium.

BACKGROUND

Automated vehicles are able to execute travel automatically, i.e. without a human driver. Various methods for longitudinal guidance and transverse guidance of passenger cars which travel in an automated fashion are known in this respect. The focus of these methods is generally on lane center guidance in which the vehicle is kept in the center of the lane, and on longitudinal control in which a specific distance from vehicles travelling ahead or other infrastructure features is maintained. In contrast, methods for automated longitudinal and transverse guidance for automated utility vehicles, in which context the term "utility vehicles" is understood to mean not only pure tractor machines but also tractor-trailer combinations in all their conceivable embodiments, are less well known. Since the large number of trailers and various arrangements of the wheels (double-axle, twin wheels, etc.) for utility vehicles and in particular for tractor-trailer combinations results in a large number of possible configurations, automated longitudinal guidance and transverse guidance for such vehicles proves to be particularly complex. In this context, the complexity in respect of the trajectory planning and the longitudinal control and transverse control of automated utility vehicles arises, on the one hand, as a result of the respective embodiment and the load state of the utility vehicle and, on the other hand, as a result of trajectory planning which has been adapted as a result of the situation. It is therefore necessary, for example in the case of a partially laden milk truck whose load permits bend-dependent load distribution with changing of the center of gravity, to plan and control a bend differently than, for example, in the case of an unladen semitrailer truck with trailer. An important factor for the trajectory planning and trajectory control is here the weight of the utility vehicle and/or the load per axle of the utility vehicle. In conventional utility vehicles, that is to say non-automated ones, the drivers acquire this information relatively quickly on the basis of their experience from the first driving maneuvers of a newly laden tractor-trailer combination.

SUMMARY

The object of the disclosure is to make available a possible way of improving the trajectory planning and trajectory control in automated utility vehicles.

A method for operating an automated utility vehicle is provided, in which after a change in the load state of the automated utility vehicle a current weight and/or a current load distribution of the automated utility vehicle is determined and is made available in the form of current load information. The current load information is subsequently used for the situation-dependent adaptation of planning and of control of a trajectory of the automated utility vehicle. Vehicle safety is increased by determining an important variable for the safe planning and control of trajectories of the automated utility vehicle. In particular, situation-dependent accidents owing to unsuitable parameters can be avoided in this way.

In one embodiment there is provision that at least one method for trajectory planning and/or trajectory control of the automated utility vehicle is parameterized on the basis of the current load information, in order to optimize at least one driving maneuver of the automated utility vehicle in accordance with the current load information and a traffic situation lying ahead. As a result, the behavior of the automated utility vehicle can be improved in a targeted fashion in specific traffic situations, and the driving safety can therefore be increased.

In a further embodiment there is provision that the current load information is used to calibrate and/or verify spring travel, adjustable in accordance with the load, at at least one wheel suspension element of the automated utility vehicle and/or for calibrating and/or verifying an electronic ride level control system of the automated utility vehicle. The operation of this system can be improved by calibrating and/or verifying the spring travel values of the utility vehicle which can be adjusted in a load-dependent fashion. Owing to the optimized spring travel adjustment, the position of the automated utility vehicle on the road and therefore also the driving behavior of the vehicle can be improved, in particular in specific driving situations such as, for example, during cornering and braking maneuvers. The calibration and/or verification of the electronic ride level control can also improve the position on the road and the driving behavior of the automated utility vehicle.

In a further embodiment there is provision that the current load information is determined within the scope of a loading process at a loading center using a balance of the loading center and is made available to the automated utility vehicle. This ensures that the parameterization of the methods for trajectory planning and trajectory control can also be carried out before the journey starts.

In a further embodiment there is provision that the trajectory from the current starting position of the automated utility vehicle at the load center to the balance is determined. In addition, a stopping position on the balance, in which the automated utility vehicle is arranged in an optimum fashion on the balance, is determined. Then, control signals are output in order to move the automated utility vehicle from its starting position to a stopping position, along the trajectory. As a result, the movement of the automated utility vehicle onto the balance and therefore also the determination of the weight and/or the load distribution of the automated utility vehicle are/is optimized.

In a further embodiment there is provision that the current weight and/or the current load distribution of the automated utility vehicle are/is determined using a balance which is segmented into a plurality of load receptors. In this context, the length of the balance and/or the dimensions of the individual load receptors are made available in the form of information. Then, this information is used to determine the stopping position of the automated utility vehicle on the balance in such a way that each of its axles comes to rest on a respective separate load receptor of the balance. As a result, it becomes possible to determine the load distribution of each of the axles of the automated utility vehicle individually. The methods for trajectory planning and trajectory control can be parameterized particularly precisely by means of this information.

In a further embodiment there is provision that the current length and/or the current position of the automated utility vehicle is determined using at least one infrastructure sensor of the loading center and is made available in the form of current position information to the automated utility vehicle. Then, the current position information is used to control the movement of the automated utility vehicle onto the balance. The movement of the automated utility onto the balance can be optimized by the use of the infrastructure sensors of the loading center.

In a further embodiment there is provision that in the case of an automated utility vehicle which is embodied in the form of a tractor-trailer combination composed of a tractor machine and at least one trailer, the determination of the weight and/or of the load distribution of the automated utility vehicle takes place in a plurality of sub-steps. For this purpose, control signals are output which control the movement of the automated utility vehicle onto the balance in such a way that the tractor machine and each trailer each come to a standstill separately and successively on the balance.

In addition, the control device is provided for controlling an automated utility vehicle or the loading center, which control device is configured to execute the method. Such a control device permits an automated utility vehicle to determine the corresponding load information and to use it to parameterize its methods for trajectory planning and trajectory control. In contrast, a corresponding control device permits a loading center to determine the corresponding load information of an automated utility vehicle and to make available this information to the respective automated utility vehicle for parameterization of its methods for trajectory planning and trajectory control.

Moreover, a computer program is provided, comprising commands which, when the computer program is run by a computer, cause said computer to execute a method as specified above.

Finally, a machine-readable storage medium is provided in which the above-mentioned computer program is stored.

BRIEF DESCRIPTION OF THE DRAWINGS

The disclosure will be described in more detail below with reference to figures. In this context.

DETAILED DESCRIPTION

The concept described here relates to a system comprising an automated utility vehicle which in the normal operating mode travels in an automated fashion between the so-called hub (loading centers for utility vehicles which travel in an automated fashion) as well as at least one such loading center. In this context, a method for determining load information which relates to the weight and/or the load distribution of the automated utility vehicle, and for the use of this information for trajectory planning and trajectory control adapted in a situation-dependent fashion is.

Figure 1:
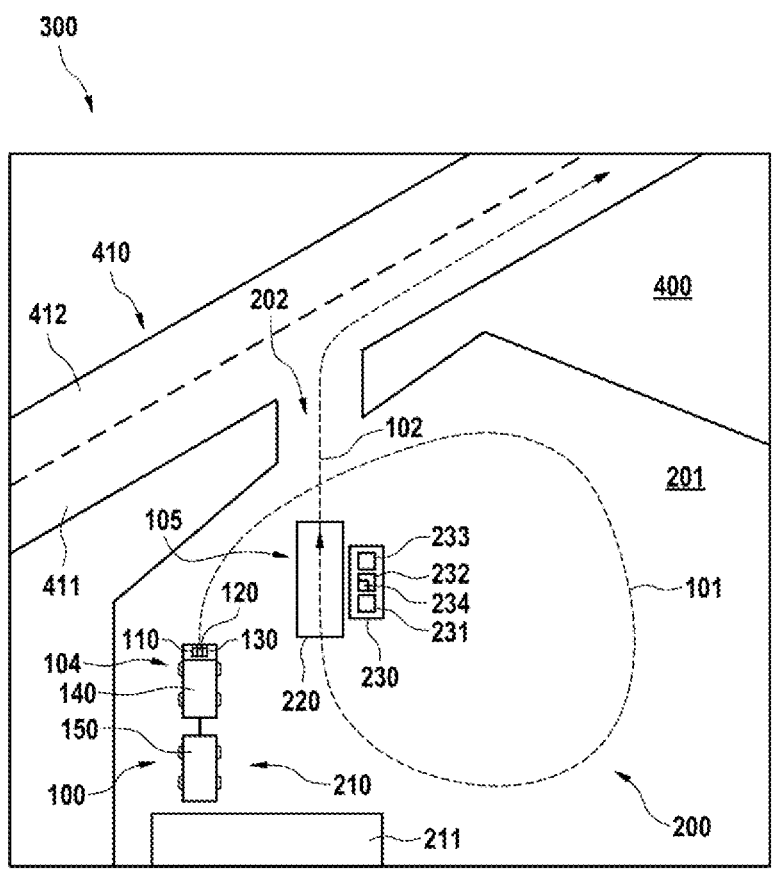
FIG. 1 is a schematic view of a loading center with an automated vehicle which is performing the loading and its trajectory for movement onto a balance.

In this respect, FIG. 1 shows a schematic plan view of a loading center 200 for utility vehicles which travel in an automated fashion and of an automated utility vehicle 100 which is currently located in dispatch. The automated utility vehicle can be a fully automated, highly automated or a partially automated utility vehicle. The utility vehicle having an assistance system in which a human driver continuously executes the transverse guidance or the longitudinal guidance while the respective other driving function is executed within certain limits by the assistance system is basically also possible for this.

The loading center 100 typically comprises a site 201 which can be traveled on and has infrastructure for loading goods onto utility vehicles. In the present exemplary embodiment, a loading device 211, which comprises, for example, a warehouse with one or more loading ramps, is located on the site 201. Since the infrastructure of a loading center generally depends on the type of goods to be loaded, the arrangement illustrated here is to be understood as merely an example. Depending on the loaded material, for example other loading devices may also be located on the site 201 of the loading center 100, such as for example silos, tanks, cranes etc. The loading center 200 which is illustrated schematically in FIG. 1 is separated off from the surroundings 400 here by means of a suitable boundary 203 and is connected to a road network by means of an access road 202. A balance 220 for determining the weight or the load distribution of utility vehicles is also located on the site 201 of the loading center 200. Said balance 220 here is preferably a platform which is let into the ground, can be traveled on and, depending on the design, can also be segmented into a plurality of separately measuring load receptors $221_1$-$221_n$. In addition, in the present example the loading center 200 also comprises a control and monitoring system 230 for controlling and monitoring the processes running on the site 201 of the loading center 200. In the present example, the control and monitoring system 230 comprises for this purpose a sensor device 231 with at least one sensor for sensing objects on the site 201 of the loading center 200 and a control device 232 for evaluating the sensor data and for controlling the processes of the loading center 200. In addition, the control and monitoring system 230 also comprises a communication device 233 for communication with objects in the area of the loading center 200. In the present example, the communication device 233 is designed to perform wireless communication or data transfer with the automated utility vehicle 100.

The automated utility vehicle 100 which is embodied here, by way of example, in the form of a tractor-trailer combination composed of a tractor machine 140 and a trailer 150 is located in a loading zone 210 of the loading center 200, in order to load goods. In this context, the term "loading" is used here for all processes in which the load state of the automated utility vehicle 100 changes. This includes, in particular, loading and unloading and transferring goods onto or from the automated utility vehicle 100.

After a successful loading process and still before the receipt of a departure permit, the weight and the load distribution of the utility vehicle 100 which is now ready to depart is firstly determined using a balance 220 which is provided for this purpose. The balance 220 is preferably a balance which can be traveled on and comprises at least one platform let into the ground.

For this purpose, in a first step a suitable trajectory 101 for moving from the current position (starting position) 104 of the automated utility vehicle 100 onto the balance 220 is determined. For this purpose, both the current position 104 of the automated utility vehicle 100 on the site 201 of the loading center 200 and the stopping position 105, 106, 107 provided on the balance 220 are determined. In this context, the current position 104 of the automated utility vehicle 100 can, unless it is already known sufficiently precisely, be determined by means of known location-determining methods. For example a satellite-supported location-determining process or a location-determining process based on the on-board surroundings-sensing sensor system, such as for example radar sensors, lidar sensors, video sensors or ultrasonic sensors, are suitable for this. In addition, the location-determining process can also be carried out using one or more infrastructure sensors 231 of the loading center 200, wherein the corresponding position data is then transmitted to the automated utility vehicle 100. Basically all suitable sensors, for example video cameras, lidar sensors or radar sensors, photoelectric barriers, magnetic coils let into the ground etc. are suitable as infrastructure sensors for this. The stopping position 105, 106, 107 is preferably determined here in such a way that the automated utility vehicle 100 fits completely onto the balance 220. If this is not possible because the automated utility vehicle 100 is embodied, for example, in the form of a long tractor-trailer combination composed of a tractor machine 140 and one or more trailers 150, 160, the automated utility vehicle 100 can also be weighed in a plurality of steps. For this, the stopping position or the stopping positions 105, 106, 107 is/are preferably determined in such a way that firstly the tractor machine 140 and subsequently trailers 150, 160 come to a standstill as completely as possible on the balance 220.

The approach trajectory 101 of the automated utility vehicle 100 to the balance 220 can basically be carried out using known methods on the basis of map information and the on-board sensor system of the automated utility vehicle 100. During the determination of the approach trajectory 101, the dimensions of the automated utility vehicle 100 as well as its current load state are preferably also taken into account. If the abovementioned information is available, the automated utility vehicle 100 sets off and suitably adjusts the determined approach trajectory 101. The travel is preferably implemented here in such a slow way that possibly incorrectly estimated assumptions with respect to the weight of the automated utility vehicle 100 do not bring about driving states which are critical for safety. After the automated utility vehicle 100 has reached the provided stopping position 105, 106, 107 on the balance 220, the measurement of weight is started. Depending on the configuration of the balance 220, both the overall weight and the load distribution of the automated utility vehicle 100 are determined here. In particular, the load distribution per axle or per wheel or double wheel of the automated utility vehicle 100 can be determined using a corresponding segmented balance 220.

In the case of tractor-trailer combinations composed of a tractor machine 140 and one or more trailers 150, 160 the measurement can also be carried out separately for the tractor machine 140 and the trailers 150, 160, respectively.

After the conclusion of the weight measurement, the measurement results are subsequently made available to the automated utility vehicle 100 in the form of at least one load information item. This is preferably carried out using a wireless communication link, with both the loading center 200 and the automated utility vehicle 100 being equipped with wireless communication devices 131, 233.

After the reception of the corresponding load information, a control device 120 uses the automated utility vehicle 100 to parameterize at least one method for planning and/or controlling the trajectory of the automated vehicle 100, with the result that an optimum maneuver is implemented in the travel mode of the automated utility vehicle in accordance with the weight and the traffic situation lying ahead. As is shown in FIG. 1, the control device 120 can comprise a memory device 121 in the form of a machine-readable storage medium on which a computer program for carrying out the corresponding method is stored.

Figure 2:
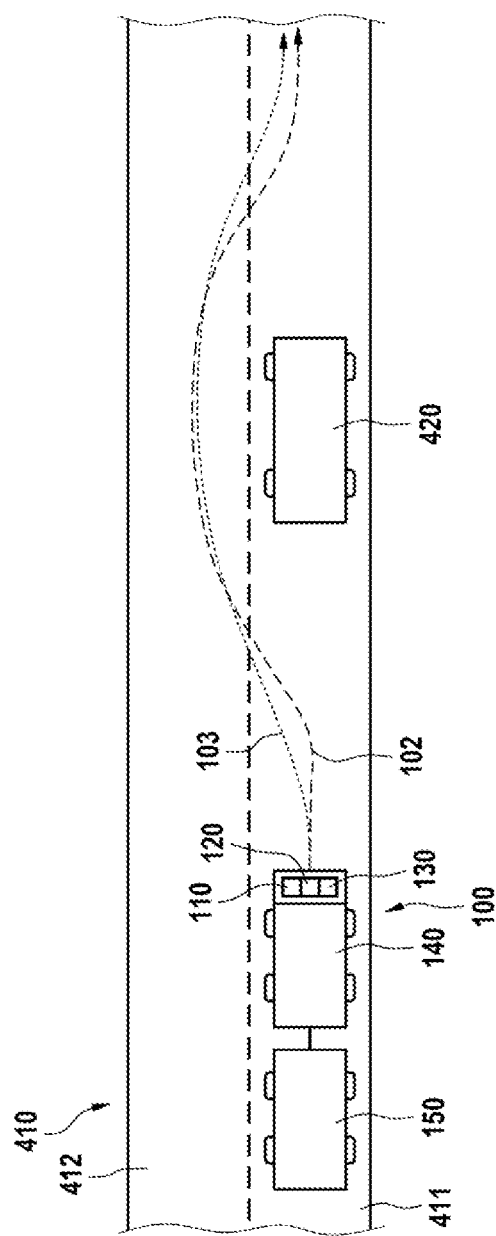
FIG. 2 shows a schematic view of a traffic situation in which the automated utility vehicle plans and controls its trajectory on the basis of current load information.
Figure 3:
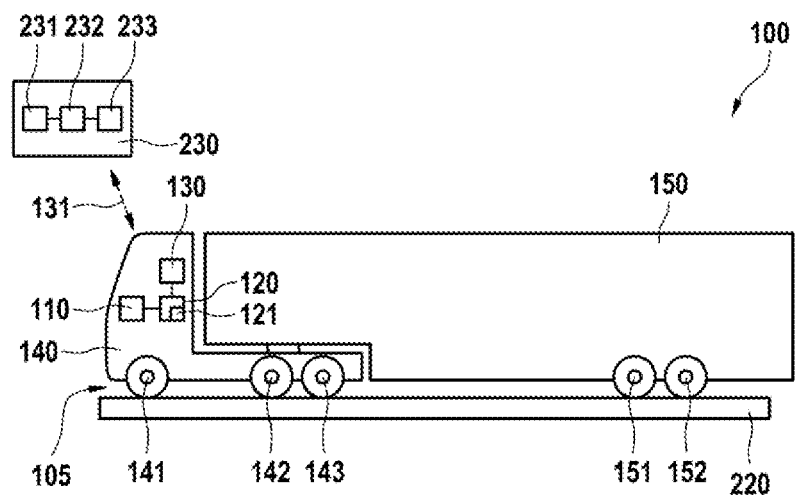
FIG. 3 shows a schematic view of the automated utility vehicle during the determination of its weight or of its load distribution on a balance of the loading center.

If its departure permit is already present at this time, the automated utility vehicle 100 starts its journey to a predefined destination with the newly parameterized method for trajectory planning and trajectory control. In the present example, the automatic utility vehicle 100 leaves the loading center 200 via the access road 202 and travels onto a road 410 along the trajectory 102. On the basis of FIG. 2, it is now illustrated by way of example how the parameterization which has previously taken place on the basis of the load information can affect the planning and the control of the trajectory of the automated utility vehicle 100. For this purpose, the automated utility vehicle 100 from FIG. 1 is shown while travelling on the right-hand carriageway 411 of the road 410. In the driving situations shown here by way of example, the automated utility vehicle 100 decides to overtake a vehicle 420 travelling ahead. To do this, the automated utility vehicle 100 plans a corresponding overtaking maneuver in which the automated utility vehicle changes over to the oncoming lane 412, and returns to its own lane 411 after overtaking the vehicle 420. In this context, a trajectory which the automated utility vehicle 100 would use to carry out the overtaking maneuver in a normal situation while taking into account the current driving situations is illustrated by means of the dashed line 102. Owing to the new parametrization of its methods for trajectory planning and trajectory control on the basis of the load information determined at the loading center 200, an optimized trajectory 103 which differs from the normal trajectory 102 is now produced for the automated utility vehicle 100. As is indicated schematically in FIG. 2, the trajectory 103 which is optimized on the basis of the current load information can, for example, provide that the automated vehicle 100 uses a smaller steering angle during the imminent overtaking maneuver. Basically, the newly parameterized trajectory planning and control can also act on other travel parameters of the automated utility vehicle 100, such as for example the velocity, accelerations or distance from the vehicles travelling ahead, as well as on decision processes, such as for example whether an overtaking maneuver is to take place or not.

In the following FIGS. 3 to 7, the weighing process of the automated utility vehicle 100 on a balance 220 of the loading center 200 is explained various configurations. In this respect, FIG. 3 first shows the weighing process of an automated utility vehicle 100 which is in the form of a tractor-trailer combination composed of a tractor machine 140 in the form of a semitrailer truck and a correspondingly designed trailer 150. The automated utility vehicle 100 comprises a sensor device 110 with at least one surroundings sensor for sensing the surroundings, a control device 120 for controlling the operation of the automated utility vehicle 100 and a wireless communication device 130 for establishing a wireless communication link 131 to a wireless communication device 223 of a control and monitoring system 230 of the loading center 200. The control device 120 which is illustrated schematically here can, depending on the design, be embodied either in the form of an individual control unit or in the form of a plurality of control units which communicate with one another and are arranged distributed in the vehicle. In the situations illustrated in FIG. 3, the automated utility vehicle 100 is already located in a suitable stopping position 105, 106, 107 on the balance 220, which is embodied in the form of a platform which is let into the ground of the loading center site 201. The stopping position 105, 106, 107 has been determined here in such a way that the entire tractor-trailer combination and, in particular, all the axles of the tractor machine 140 and of the trailer 150 come to a stop on the balance 220. In this context, the optimum stopping position 105, 106, 107 of the automated utility vehicle 100 on the balance 120 can be determined according to the application using both the sensor device 110 and the control device 120 of the automated utility vehicle 100 and the infrastructure sensor system 231 and the control device 232 of the loading center 200. It is therefore possible, for example, for the control device 232 of the loading center 200 to transfer corresponding information about the dimensions and the position of the balance 220 to the automated utility vehicle 100 via the wireless communication link 131. The automated utility vehicle 100 can then use its sensor device 110 to move onto the balance 220. As an alternative to this it is possible to determine the optimum stopping position 105, 106, 107 of the automated utility vehicle 100 by means of the control device 232 of the loading center 200 and to transfer it to the automated utility vehicle 100. In addition, the movement of the automated utility vehicle 100 onto the balance 220 can basically also be carried out using the infrastructure sensor system 231 of the loading center 200. As is shown in FIG. 1, the control device 232 can comprise a memory device 234 in the form of a machine-readable storage medium in which a computer program for carrying out the corresponding method is stored.

Figure 4:
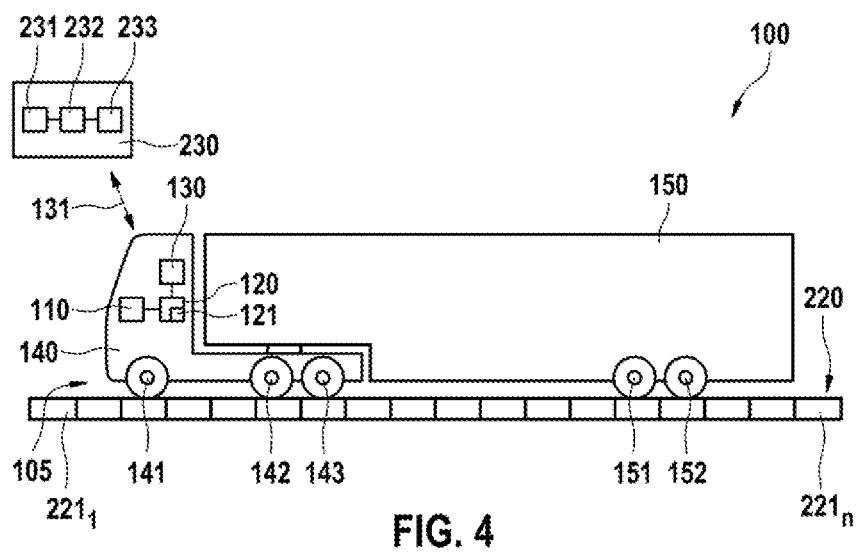
FIG. 4 shows a schematic view of the automated utility vehicle during the determination of its weight of or its load distribution on a balance, divided into a plurality of separately measuring load receptors, of the loading center.
Figure 5:
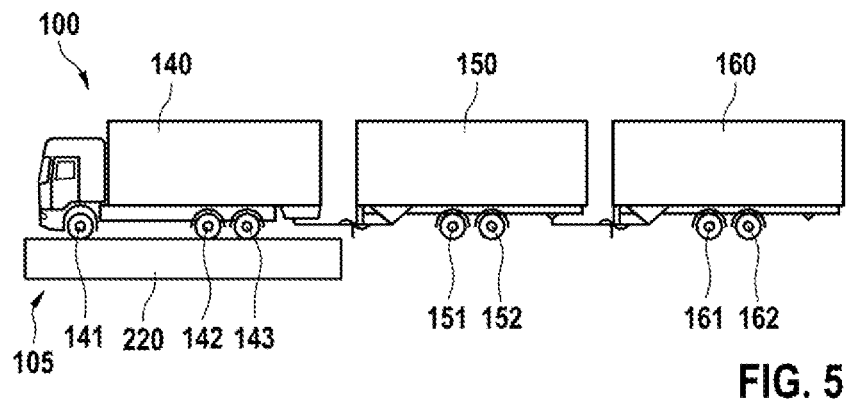
FIG. 5 shows a schematic view of an automated utility vehicle in the form of a tractor-trailer combination during the determination of the weight of the tractor machine.

Basically it is also possible to determine the current load distribution of the automated utility vehicle 100 as load information. For this purpose it is possible to use the balance 220 which is illustrated in FIG. 4 and is constructed from a plurality of load receptors $221_1$-$221_n$ which each measure separately. With such a balance 220 it is possible to determine the axle load for each of the axles 141, 142, 143, 151, 152 of the automated utility vehicle 100 separately. Basically it is also possible to use a correspondingly embodied balance with the weight for individual wheels of the automated utility vehicle 100 is determined (not shown here).

Figure 6:
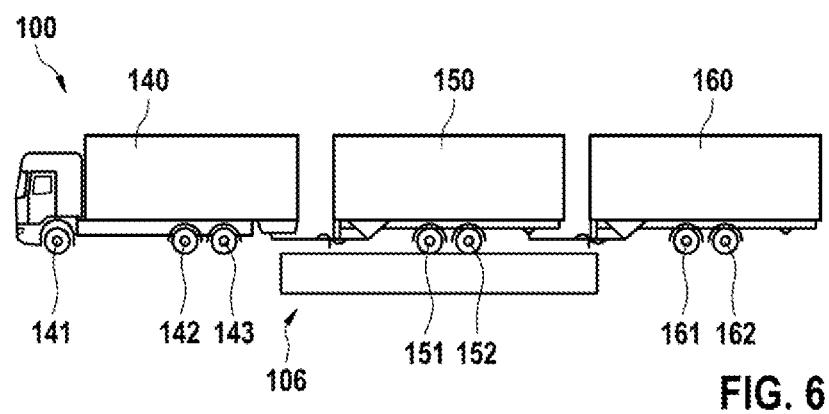
FIG. 6 shows the tractor-trailer combination from FIG. 5 during the determination of the weight of the first trailer.
Figure 7:
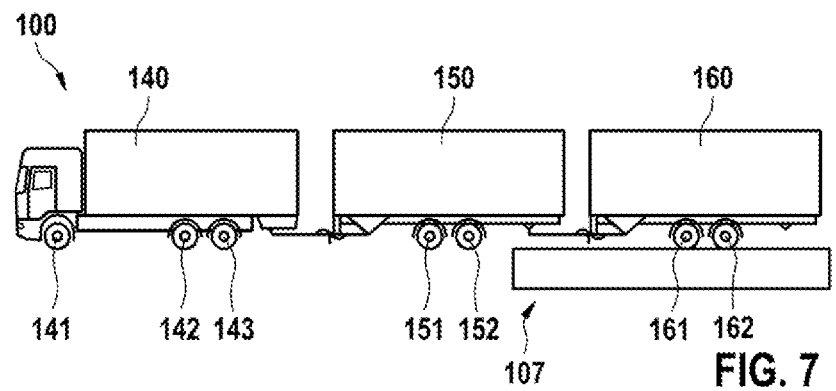
FIG. 7 shows the tractor-trailer combination from FIG. 5 during the determination of the weight of the second trailer.

If, owing to its length, the automated utility vehicle 100 does not fit completely onto the balance 220, individual parts of the automated utility vehicle can also be measured in succession. Such a measuring process for an automated utility vehicle 100 in the form of a tractor-trailer combination which is composed of a tractor machine 140 and two trailers 150, 160 is also illustrated by way of example in FIGS. 5 to 7. As is illustrated schematically in FIG. 5, the stopping position 105 is initially determined here in such a way that only the tractor machine 140 comes to a standstill in an optimum fashion on the balance 120. Then, the automated utility vehicle 100 moves to a second stopping position 106 at which the first trailer 150 comes to a standstill completely on the balance 220. This situation is illustrated in FIG. 6. Finally, the automated vehicle 100 sets off again and comes to a standstill at a third stopping position 107 at which the second trailer 160 comes to a standstill completely on the balance. This situation is illustrated in FIG. 7.

After the weight or the load distribution of the automated utility vehicle 100 has been determined using the balance 220, the control device 232 transfers this data in the form of at least one current load information item to the automated utility vehicle 100 which uses the current load information to newly parameterize its methods for trajectory planning and trajectory control. The automated utility vehicle 100 subsequently continues its journey in a planned fashion.

Although the disclosure has been illustrated and described in detail by means of the preferred exemplary embodiments, the disclosure is not restricted by the disclosed examples. Rather, a person skilled in the art can also derive other variations therefrom without departing from the scope of protection of the disclosure.

What is claimed is:

1. A method for operating an automated utility vehicle, the method comprising:
    determining a current position and a current length of the automated utility vehicle using at least one infrastructure sensor of a loading center;
    making the current position and the current length available to the automated utility vehicle as current position information;
    determining a trajectory from the current position to a balance of the loading center, using the current position information;
    determining, based on the current position and the current length, a stopping position on the balance at which the automated utility vehicle is arranged in an optimum fashion on the balance;
    outputting control signals in order to move the automated utility vehicle from the current position to the stopping position, along the trajectory;
    determining, once the automated utility vehicle is moved to the stopping position on the balance, at least one of a current weight and a current load distribution of the automated utility vehicle after a change in a load state of the automated utility vehicle, the at least one of the current weight and the current load distribution being determined using the balance of the loading center;
    making the at least one of the current weight and the current load distribution available to the automated utility vehicle as current load information; and
    using the available current load information for situation-related adaptation of at least one of trajectory planning and trajectory control of the automated utility vehicle.

2. The method according to claim 1, further comprising:
    parameterizing at least one method for the at least one of the trajectory planning and the trajectory control of the automated utility vehicle based on the current load information, in order to optimize at least one driving maneuver of the automated utility vehicle in accordance with the current load information and a traffic situation lying ahead.

3. The method according to claim 1, further comprising:
    using the current load information to at least one of calibrate and verify at least one of (i) spring travel, adjustable in accordance with a load, of at least one wheel suspension element of the automated utility vehicle and (ii) an electronic ride level control system of the automated utility vehicle.

4. The method according to claim 1, wherein the current load information is determined within a scope of a loading process at the loading center.

5. The method according to claim 1, further comprising:
determining the at least one of the current weight and the current load distribution using the balance, which is segmented into a plurality of load receptors;
wherein at least one of a length of the balance and dimensions of individual load receptors of the plurality of load receptors are made available as balance information, and
wherein the balance information is used to determine the stopping position of the automated utility vehicle on the balance in such a way that each axle of the automated utility vehicle comes to rest on a respective individual load receptor of the balance.

6. The method according to claim 1, wherein a current length of the automated utility vehicle is determined using the at least one infrastructure sensor of the loading center and is made available as the current position information to the automated utility vehicle.

7. The method according to claim 1, wherein:
the automated utility vehicle is embodied as a tractor-trailer combination composed of a tractor machine and at least one trailer, and
the determination of the at least one of the current weight and the current load distribution takes place in a plurality of sub-steps in that control signals are output which control the movement of the automated utility vehicle onto the balance in such a way that the tractor machine and each trailer each come to a standstill separately and successively on the balance.

8. The method according to claim 1, wherein a controller for controlling the automated utility vehicle or a loading center is configured to carry out the method.

9. The method according to claim 1, wherein a computer program includes commands which, when the computer program is run by a computer, cause the computer to carry out the method.

10. The method according to claim 9, wherein the computer program is stored on a machine-readable storage medium.

11. A method for operating an automated utility vehicle, the method comprising:
determining a current position and a current length of the automated utility vehicle using at least one infrastructure sensor of a loading center;
making the current position and a current length available to the automated utility vehicle as current position information;
determining a trajectory from the current position to a balance of the loading center, using the current position information, the balance being segmented into a plurality of load receptors;
determining, based on the current position and the current length, a stopping position on the balance at which the automated utility vehicle is arranged in an optimum fashion on the balance;
outputting control signals in order to move the automated utility vehicle from the current position to the stopping position, along the trajectory;
determining, once the automated utility vehicle is moved to the stopping position on the balance, at least one of a current weight and a current load distribution of the automated utility vehicle after a change in a load state of the automated utility vehicle, the at least one of the current weight and the current load distribution being determined using the balance of the loading center;
making the at least one of the current weight and the current load distribution available to the automated utility vehicle as current load information; and
using the available current load information for situation-related adaptation of at least one of trajectory planning and trajectory control of the automated utility vehicle,
wherein at least one of a length of the balance and dimensions of individual load receptors of the plurality of load receptors are made available as balance information, and wherein the balance information is used to determine the stopping position of the automated utility vehicle on the balance in such a way that each axle of the automated utility vehicle comes to rest on a respective individual load receptor of the balance.

12. A method for operating an automated utility vehicle, the method comprising:
determining a current position and a current length of the automated utility vehicle using at least one infrastructure sensor of a loading center;
making the current position and a current length available to the automated utility vehicle as current position information;
determining a trajectory from the current position to a balance of the loading center, using the current position information;
determining, based on the current position and the current length, a stopping position on the balance at which the automated utility vehicle is arranged in an optimum fashion on the balance;
outputting control signals in order to move the automated utility vehicle from the current position to the stopping position, along the trajectory;
determining, once the automated utility vehicle is moved to the stopping position on the balance, at least one of a current weight and a current load distribution of the automated utility vehicle after a change in a load state of the automated utility vehicle, the at least one of the current weight and the current load distribution being determined using the balance of the loading center;
making the at least one of the current weight and the current load distribution available to the automated utility vehicle as current load information; and
using the available current load information for situation-related adaptation of at least one of trajectory planning and trajectory control of the automated utility vehicle,
wherein the automated utility vehicle is embodied as a tractor-trailer combination composed of a tractor machine and at least one trailer, and
wherein the determination of the at least one of the current weight and the current load distribution takes place in a plurality of sub-steps in that control signals are output which control the movement of the automated utility vehicle onto the balance in such a way that the tractor machine and each trailer each come to a standstill separately and successively on the balance.

* * * * *